(12) United States Patent
Gupta et al.

(10) Patent No.: US 11,809,382 B2
(45) Date of Patent: Nov. 7, 2023

(54) SYSTEM AND METHOD FOR SUPPORTING VERSIONED OBJECTS

(71) Applicant: Nutanix, Inc., San Jose, CA (US)

(72) Inventors: Karan Gupta, San Jose, CA (US); Roger Liao, San Jose, CA (US); Anand Varma Chekuri, San Jose, CA (US); Rishi Bhardwaj, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 454 days.

(21) Appl. No.: 16/526,894

(22) Filed: Jul. 30, 2019

(65) Prior Publication Data

US 2020/0311039 A1    Oct. 1, 2020

Related U.S. Application Data

(60) Provisional application No. 62/827,773, filed on Apr. 1, 2019.

(51) Int. Cl.
| | | |
|---|---|---|
| *G06F 15/16* | (2006.01) | |
| *G06F 16/18* | (2019.01) | |
| *G06F 16/901* | (2019.01) | |
| *G06F 16/14* | (2019.01) | |
| *G06F 16/11* | (2019.01) | |

(52) U.S. Cl.
CPC ........ *G06F 16/1873* (2019.01); *G06F 16/125* (2019.01); *G06F 16/148* (2019.01); *G06F 16/9027* (2019.01)

(58) Field of Classification Search
CPC ............. G06F 16/1873; G06F 16/9027; G06F 16/148; G06F 16/125; G06F 9/44536; G06F 9/4488; G06F 8/71
See application file for complete search history.

(56) References Cited

U.S. PATENT DOCUMENTS 5,802,309 A    9/1998   Cook et al.
6,209,128 B1 *  3/2001   Gerard ..................... G06F 8/70
                                                            707/999.202

(Continued)

FOREIGN PATENT DOCUMENTS

CN       113406169 A     9/2021
EP       4 006 737 A1    6/2022

(Continued)

OTHER PUBLICATIONS

B+-Tree Indexes. http://web.csulb.edu/~amonge/classes/common/db/B+TreeIndexes.html, Aug. 4, 2018, pp. 1-7. (Year: 2018).*

(Continued)

*Primary Examiner* — Alex Gofman
*Assistant Examiner* — Shelly X Qian
(74) *Attorney, Agent, or Firm* — Foley & Lardner LLP

(57) ABSTRACT

An illustrative embodiment disclosed herein is an apparatus including a processor having programmed instructions to update a versioned object by appending a latest version of the versioned object to a data structure, read a predetermined version identifier corresponding to the latest version from a pointer entry, and look up the latest version of the versioned object, in the data structure, using the predetermined version identifier corresponding to the latest version of the versioned object.

20 Claims, 5 Drawing Sheets

(56) References Cited

U.S. PATENT DOCUMENTS

| | | |
|---|---|---|
| 6,775,673 B2 | 8/2004 | Mahalingam et al. |
| 7,395,279 B2 | 7/2008 | Iyengar et al. |
| 7,461,912 B2 | 12/2008 | Kamiyama et al. |
| 7,653,668 B1 | 1/2010 | Shelat et al. |
| 7,685,109 B1 | 3/2010 | Ransil et al. |
| 7,721,044 B1 | 5/2010 | Chatterjee et al. |
| 8,019,732 B2 | 9/2011 | Paterson-Jones et al. |
| 8,166,128 B1 | 4/2012 | Faulkner et al. |
| 8,250,033 B1 | 8/2012 | De Souter et al. |
| 8,312,027 B2 | 11/2012 | Lamb et al. |
| 8,352,424 B2 | 1/2013 | Zunger et al. |
| 8,549,518 B1 | 10/2013 | Aron et al. |
| 8,554,724 B2 | 10/2013 | Zunger |
| 8,601,473 B1 | 12/2013 | Aron et al. |
| 8,683,112 B2 | 3/2014 | Drobychev et al. |
| 8,799,222 B2 | 8/2014 | Marathe et al. |
| 8,849,759 B2 | 9/2014 | Bestler et al. |
| 8,850,130 B1 | 9/2014 | Aron et al. |
| 8,863,124 B1 | 10/2014 | Aron |
| 8,930,693 B2 | 1/2015 | Holt et al. |
| 8,997,088 B2 | 3/2015 | Gurikar et al. |
| 9,003,335 B2 | 4/2015 | Lee et al. |
| 9,009,106 B1 | 4/2015 | Aron et al. |
| 9,043,372 B2 | 5/2015 | Makkar et al. |
| 9,043,567 B1 | 5/2015 | Modukuri et al. |
| 9,052,942 B1 | 6/2015 | Barber et al. |
| 9,069,708 B2 | 6/2015 | Gill et al. |
| 9,069,983 B1 | 6/2015 | Nijjar |
| 9,110,882 B2 | 8/2015 | Overell et al. |
| 9,256,498 B1 | 2/2016 | Leibowitz et al. |
| 9,336,132 B1 | 5/2016 | Aron et al. |
| 9,342,253 B1 | 5/2016 | Muthukkaruppan et al. |
| 9,350,623 B2 | 5/2016 | Shadi et al. |
| 9,405,806 B2 | 8/2016 | Lysne et al. |
| 9,652,265 B1 | 5/2017 | Narayanasamy et al. |
| 9,705,970 B2 | 7/2017 | Pomerantz et al. |
| 9,747,287 B1 | 8/2017 | Bhardwaj et al. |
| 9,772,866 B1 | 9/2017 | Aron et al. |
| 9,805,054 B2 | 10/2017 | Davis et al. |
| 10,003,650 B2 | 6/2018 | Shetty et al. |
| 10,095,549 B1 | 10/2018 | Needham et al. |
| 10,120,902 B2 | 11/2018 | Erdogan et al. |
| 10,152,428 B1 | 12/2018 | Alshawabkeh et al. |
| 10,176,225 B2 | 1/2019 | Naidu et al. |
| 10,296,255 B1 | 5/2019 | Tummala |
| 10,380,078 B1 | 8/2019 | Kumar et al. |
| 10,528,262 B1 | 1/2020 | Shmuylovich et al. |
| 10,565,230 B2 | 2/2020 | Zheng et al. |
| 10,592,495 B1 | 3/2020 | Shami et al. |
| 10,659,520 B1 | 5/2020 | Sethuramalingam et al. |
| 10,691,464 B1 | 6/2020 | Drego et al. |
| 10,725,826 B1 | 7/2020 | Sagar et al. |
| 10,740,302 B2 | 8/2020 | Slik et al. |
| 10,747,752 B2 | 8/2020 | Krishnaswamy et al. |
| 10,802,975 B2 | 10/2020 | Gottin et al. |
| 10,915,497 B1 | 2/2021 | Bono et al. |
| 11,099,938 B2 | 8/2021 | Desai et al. |
| 2001/0034733 A1 | 10/2001 | Prompt et al. |
| 2002/0065776 A1 | 5/2002 | Calder et al. |
| 2002/0078065 A1 | 6/2002 | Agulhon |
| 2003/0023587 A1 | 1/2003 | Dennis et al. |
| 2003/0145310 A1 | 7/2003 | Thames et al. |
| 2003/0172094 A1 | 9/2003 | Lauria et al. |
| 2003/0191745 A1 | 10/2003 | Jiang et al. |
| 2004/0186826 A1 | 9/2004 | Choi et al. |
| 2005/0273571 A1 | 12/2005 | Lyon et al. |
| 2006/0041661 A1 | 2/2006 | Erickson et al. |
| 2006/0047636 A1 | 3/2006 | Mohania et al. |
| 2006/0161704 A1 | 7/2006 | Nystad et al. |
| 2007/0088744 A1 | 4/2007 | Webber et al. |
| 2008/0034307 A1 | 2/2008 | Cisler et al. |
| 2009/0171697 A1 | 7/2009 | Glauser et al. |
| 2009/0327621 A1 | 12/2009 | Kliot et al. |
| 2010/0042673 A1 | 2/2010 | Dayley |
| 2010/0050173 A1 | 2/2010 | Hensbergen |
| 2011/0137966 A1 | 6/2011 | Srinivasan et al. |
| 2011/0185355 A1 | 7/2011 | Chawla et al. |
| 2011/0213884 A1 | 9/2011 | Ferris et al. |
| 2011/0258297 A1 | 10/2011 | Nightingale et al. |
| 2012/0096052 A1* | 4/2012 | Tolia ............... G06F 16/00 707/806 |
| 2012/0096205 A1 | 4/2012 | Velayudhan et al. |
| 2012/0210095 A1 | 8/2012 | Nellans et al. |
| 2012/0293886 A1 | 11/2012 | Abe et al. |
| 2012/0331065 A1 | 12/2012 | Aho et al. |
| 2013/0054523 A1 | 2/2013 | Anglin et al. |
| 2013/0103884 A1 | 4/2013 | Cho |
| 2013/0198472 A1 | 8/2013 | Fang et al. |
| 2013/0246431 A1 | 9/2013 | Ahuja et al. |
| 2013/0332608 A1 | 12/2013 | Shiga et al. |
| 2014/0279838 A1 | 9/2014 | Tsirogiannis et al. |
| 2014/0282626 A1 | 9/2014 | Muguda |
| 2014/0339117 A1 | 11/2014 | Quan et al. |
| 2014/0379840 A1 | 12/2014 | Dao |
| 2015/0012571 A1 | 1/2015 | Powell et al. |
| 2015/0046586 A1 | 2/2015 | Zhang et al. |
| 2015/0046600 A1 | 2/2015 | Kim |
| 2015/0079966 A1 | 3/2015 | Govindarajeswaran et al. |
| 2015/0208985 A1 | 7/2015 | Huang |
| 2015/0254325 A1 | 9/2015 | Stringham |
| 2015/0378767 A1 | 12/2015 | Tarasuk-Levin et al. |
| 2016/0048408 A1 | 2/2016 | Madhu et al. |
| 2016/0092326 A1 | 3/2016 | Wu et al. |
| 2016/0117226 A1 | 4/2016 | Hetrick et al. |
| 2016/0162547 A1 | 6/2016 | Morris |
| 2016/0188407 A1 | 6/2016 | Bronnikov et al. |
| 2016/0207673 A1 | 7/2016 | Shlonsky et al. |
| 2016/0275125 A1 | 9/2016 | Drobychev et al. |
| 2016/0306643 A1 | 10/2016 | Klee et al. |
| 2017/0075909 A1 | 3/2017 | Goodson et al. |
| 2017/0091235 A1 | 3/2017 | Yammine et al. |
| 2017/0109421 A1 | 4/2017 | Stearn et al. |
| 2017/0235764 A1 | 8/2017 | Sharpe et al. |
| 2017/0235818 A1 | 8/2017 | Gorski et al. |
| 2017/0242746 A1 | 8/2017 | King et al. |
| 2017/0344575 A1 | 11/2017 | Naylor et al. |
| 2017/0351450 A1 | 12/2017 | Brandl et al. |
| 2018/0165161 A1 | 6/2018 | Slater et al. |
| 2018/0205791 A1 | 7/2018 | Frank et al. |
| 2018/0292999 A1 | 10/2018 | Nadkarni |
| 2018/0349463 A1 | 12/2018 | Bernhardy et al. |
| 2019/0004863 A1 | 1/2019 | Mainali et al. |
| 2019/0102256 A1 | 4/2019 | Murphy |
| 2019/0196885 A1 | 6/2019 | Song et al. |
| 2019/0207929 A1 | 7/2019 | Koorapati et al. |
| 2019/0213175 A1 | 7/2019 | Kong et al. |
| 2019/0213179 A1 | 7/2019 | McHugh et al. |
| 2019/0227713 A1 | 7/2019 | Parthasarathy |
| 2019/0243547 A1 | 8/2019 | Duggal et al. |
| 2019/0286465 A1 | 9/2019 | Cui et al. |
| 2019/0324874 A1 | 10/2019 | Gill et al. |
| 2019/0354544 A1 | 11/2019 | Hertz et al. |
| 2019/0370043 A1 | 12/2019 | Olderdissen |
| 2019/0370362 A1 | 12/2019 | Mainali et al. |
| 2019/0384678 A1 | 12/2019 | Samprathi et al. |
| 2019/0391843 A1 | 12/2019 | Franciosi et al. |
| 2020/0004570 A1 | 1/2020 | Glade et al. |
| 2020/0036787 A1 | 1/2020 | Gupta et al. |
| 2020/0042364 A1 | 2/2020 | Kumar Shimoga Manjunatha et al. |
| 2020/0104222 A1 | 4/2020 | Ramamoorthi et al. |
| 2020/0117637 A1 | 4/2020 | Roy et al. |
| 2020/0195743 A1 | 6/2020 | Jiang et al. |
| 2020/0201724 A1 | 6/2020 | Saito et al. |
| 2020/0250044 A1 | 8/2020 | Sharma et al. |
| 2020/0310859 A1 | 10/2020 | Gupta et al. |
| 2020/0310980 A1 | 10/2020 | Gupta et al. |
| 2020/0311116 A1 | 10/2020 | Anvaripour et al. |
| 2020/0314174 A1 | 10/2020 | Dailianas et al. |
| 2020/0319909 A1 | 10/2020 | Jawahar et al. |
| 2020/0387510 A1 | 12/2020 | Ransil et al. |
| 2020/0394078 A1 | 12/2020 | Taneja et al. |
| 2021/0026661 A1 | 1/2021 | Sulcer et al. |
| 2021/0034350 A1 | 2/2021 | Chen et al. |

(56) References Cited

U.S. PATENT DOCUMENTS

| | | |
|---|---|---|
| 2021/0072917 A1 | 3/2021 | Surla et al. |
| 2021/0124651 A1 | 4/2021 | Srinivasan et al. |
| 2021/0181962 A1 | 6/2021 | Dai et al. |
| 2021/0294499 A1 | 9/2021 | Wang et al. |
| 2021/0406224 A1 | 12/2021 | Neufeld et al. |

FOREIGN PATENT DOCUMENTS

| | | |
|---|---|---|
| WO | WO-2020/146043 A1 | 7/2020 |
| WO | WO-2021/119546 A1 | 6/2021 |
| WO | WO-2021/232109 A1 | 11/2021 |

OTHER PUBLICATIONS

Stopford. Log Structured Merge Trees. Http://www.benstopford.com/2015/02/14/log-structured-merge-trees/, 2015, pp. 1-8. (Year: 2015).*

Wambler. Choosing a Primary Key: Natural or Surrogate? http://www.agiledata.org/essays/keys.html. Jul. 2018. (Year: 2018).*

Wambler. Choosing a Primary Key: Natural or Surrogate? http://www.agiledata.org/essays/keys.html, 2018, pp. 1-4. (Year: 2018).*

"Creating an NFS file share"; AWS Storage Gateway—User Guide; https://docs.aws.amazon.com/storagegateway/latest/userguide/CreatingAnNFSFileShare.html; webpage accessed on Oct. 28, 2020; pp. 1-10.

"SwiftOnFile"; Object Storage-Gluster Docs; v: release3.7.0beta1; https://staged-gluster-docs.readthedocs.io/en/release3.7.0beta1/Administrator%20Guide/Object%20Storage/; webpage accessed on Oct. 28, 2020; pp. 1-2.

Michael Bose; "A Guide on How to Mount Amazon S3 as a Drive for Cloud File Sharing"; Nakivo Blog-Cloud-Backup to Cloud; https://www.nakivo.com/blog/mount-amazon-s3-as-a-drive-how-to-guide/; Published Jun. 17, 2020; pp. 1-27.

"Configure a Pod to Use a ConfigMap", from https://kubernetes.io/docs/tasks/configure-pod-container/configure-pod-configmap/, (Oct. 2, 2019).

"Deployments", from https://kubernetes.io/docs/concepts/workloads/controllers/deployment/,(Oct. 2, 2019).

"Set up Cluster Federation with Kubefed—Kubernetes", from https://v1-14.docs.kubernetes.io/docs/tasks/federation/set-up-cluster-federation-kubefed/, (Apr. 17, 2020).

"Volumes", from https://kubernetes.io/docs/concepts/storage/volumes/, (Oct. 2, 2019).

Adding Objects to Versioning—Enabled Buckets https://docs.aws.amazon.com/AmazonS3/latest/dev/AddingObjectstoVersioningEnabledBuckets.html, (Oct. 2, 2019).

Cano, Ignacio, et al. "Curator: Self-Managing Storage for Enterprise Clusters" (Mar. 27, 2017), from https://www.usenix.org/conference/nsdi17/.

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jan. 12, 2016), from https://nutanixbible.com/.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jun. 25, 2018), from https://nutanixbible.com/.

Poitras, Steven. "The Nutanix Bible" (Jan. 3, 2017), from https://nutanixbible.com/.

Poitras, Steven. "The Nutanix Bible" (Jan. 3, 2018), from https://nutanixbible.com/.

Poitras, Steven. "The Nutanix Bible" (Sep. 4, 2015), from https://nutanixbible.com/.

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jan. 8, 2019), from https://nutanixbible.com/.

Poitras, Steven. "The Nutanix Bible" (Jun. 8, 2017), from https://nutanixbible.com/.

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Jun. 9, 2016), from https://nutanixbible.com/.

Retrieving Object Versions https://docs.aws.amazon.com/AmazonS3/latest/dev/RetrievingObjectVersions.html, (Oct. 2, 2019).

"AWS Pricing"; Amazon Web Services; https://aws.amazon.com/pricing/; Webpage accessed on Jun. 23, 2021; pp. 1-9.

"Cloud & Hosting Services—Building a Cloud Infrastructure"; NetApp; https://www.netapp.com/hybrid-cloud/service-provider-infrastructure/; webpage accessed on Jun. 23, 2021; pp. 1-11.

"IT Service Provider Technology Solutions and Services"; HPE—Hewlett Packard; https://www.hpe.com/us/en/solutions/service-providers.html?parentPage=/us/en/solutions/service-providers; Webpage accessed on Jun. 23, 2021; pp. 1-6.

"Managed VMware Cloud Services"; VMware; https://cloud.vmware.com/providers/managed-services-provider; Webpage accessed on Jun. 23, 2021; pp. 1-5.

"Managing your storage lifecycle"; Amazon Simple Storage Service; https://docs.aws.amazon.com/AmazonS3/latest/userguide/object-lifecycle-mgmt.html; webpage accessed on Jun. 18, 2021; pp. 1-2.

"Nutanix Solution for Service Providers"; Nutanix, Inc. Solution Brief; https://aemstage.nutanix.cn/viewer?type=pdf&path=/content/dam/nutanix/resources/solution-briefs/sb-service-provider-solution-brief.pdf&icid=67VMYKPR6K6O; 2020; pp. 1-3.

"Per Virtual Machine Licensing"; VMware Per VM Pricing & Licensing Help; https://www.vmware.com/support/support-resources/licensing/per-vm.html; Webpage accessed on Jun. 23, 2021; pp. 1-7.

"Storage Tiering"; VMware Docs; https://docs.vmware.com/en/VMware-Validated-Design/5.0/com.vmware.vvd.sddc-design.doc/GUID-20D2BC02-4500-462F-A353-F9B613CC07AC.html; webpage accessed on Jun. 18, 2021; pp. 1-3.

"Transitioning objects using Amazon S3 Lifecycle"; Amazon Simple Storage Service; https://docs.aws.amazon.com/AmazonS3/latest/userguide/lifecycle-transition-general-considerations.html; Webpage was accessed on Jun. 18, 2021; pp. 1-5.

"Using Amazon S3 storage classes"; Amazon Simple Storage Service; https://docs.aws.amazon.com/AmazonS3/latest/userguide/storage-class-intro.html; Webpage accessed on Jun. 16, 2021; pp. 1-6.

Gowri Balasubramanian; "Should Your DynamoDB Table Be Normalized or Denormalized?"; AWS Database Blog; https://aws.amazon.com/blogs/database/should-your-dynamodb-table-be-normalized-or-denormalized/; Dec. 5, 2016; pp. 1-5.

Luis Ayuso; "How to Report Monthly Usage with the Flex Pricing Model"; VMware Cloud Provider Blog; May 20, 2019; pp. 1-6.

Luis Ayuso; "How to Sign Up for the new VCPP Flex Pricing Model"; VMware Cloud Provider Blog; May 20, 2019; pp. 1-6.

Luis Ayuso; "New VCPP Pricing Model Simplifies Delivering Services"; VMware Cloud Provider Blog; May 20, 2019; pp. 1-6.

Mike Deck; "Building and Maintaining an Amazon S3 Metadata Index without Servers"; AWS Big Data Blog; https://aws.amazon.com/blogs/big-data/building-and-maintaining-an-amazon-s3-metadata-index-without-servers/; Aug. 12, 2015; pp. 1-6.

"Adding objects to versioning-enabled buckets—Amazon Simple Storage Service.pdf," https://docs.aws.amazon.com/AmazonS3/latest/userguide/AddingObjectstoVersioningEnabledBuckets.html, pp. 1-2.

"Method:disks.get|Compute Engine Documentation|Google Cloud.pdf," https://cloud.google.com/compute/docs/reference/rest/v1/disks/get, pp. 1-17.

"NetApp ONTAP 9.7 Announced—StorageReview.com," (Jun. 14, 2019), https://www.peakresources.com/netapp-ontap-9-6-release-notes-and-thoughts/, pp. 1-5.

"PUT Object|Cloud Storage|Google Cloud," https://cloud.google.com/storage/docs/xml-api/put-object, pp. 1-3.

(56) References Cited

OTHER PUBLICATIONS

"Retrieving object versions from a versioning-enabled bucket—Amazon Simple Storage Service.pdf," https://docs.aws.amazon.com/AmazonS3/latest/userguide/RetrievingObjectVersions.html, pp. 1-3.
"Xml and More: OCI?Knowing Object Storage Basics" (Jan. 13, 2019), http://xmlandmore.blogspot.com/2019/01/ociknowing-object-storage-basics.html, pp. 1-6.
Amazon Simple Storage Service User Guide API Version Mar. 1, 2006 (Year: 2006).
Ballard, Brit, "Back to Basics: Writing SQL Queries," (Apr. 21, 2014), https://thoughtbot.com/blog/back-to-basics-sql, 1-17 pages.
Dellemc, "Elastic Cloud Storage (ECS)," (Aug. 2017), https://repository.usc.edu/sites/repository.usc.edu/files/ecs_overview.pdf. pages 1-57.
Dubinsky Leon, "Behind the scenes of Cloud Spanner's ExecuteQuery request|Google Cloud Blog," (Jan. 7, 2021), https://cloud.google.com/blog/topics/developers-practitioners/behind-the-scenes-of-cloud-spanners-executequery-request, pp. 1-7.
F5, "Enable Single Namespace for VMware Horizon with View Deployments," https://www.f5.com/pdf/solution-center/vmware-single-namespace-overview.pdf, pp. 1-2.
FireEye, "Building Scalable and Responsive Big Data Interfaces with AWS Lambda | AWS Big Data Blog," (Jul. 10, 2015), https://aws.amazon.com/blogs/big-data/building-scalable-and-responsive-big-data-interfaces-with-aws-lambda/, pp. 1-10.
Guess A.R., "Cloudian HyperStore 7 Multi-Cloud Data Management Unifies Public Cloud and On-Premises Storage—DataVersity," (Jan. 29, 2018), https://www.dataversity.net/cloudian-hyperstore-7-multi-cloud-data-management-unifies-public-cloud-premises-storage/, pp. 1-4.
"How to use Indexing to Improve Database Queries," https://dataschool.com/sql-optimization/how-indexing-works/, pp. 1-12.
NetApp, "A Unified Platform for Cloud Storage Infrastructure," (Oct. 26, 2020), https://cloud.netapp.com/blog/cvo-blg-one-unified-platform-for-cloud-storage-infrastructure-and-data-services, pp. 1-8.
NetApp, "StorageGRID Solves Your Unstructured Data Management Problems|NetApp Blog," (Apr. 17, 2019), https://www.netapp.com/blog/storagegrid-solves-your-unstructured-data-management-problems/, pp. 1-6.
Oracle Multimedia User's Guide, 12c Release 1 (12.1), E17697-09 Jul. 2014 (Year 2014).
Oracle SQL Developer User's Guide, Release 1.5, E12152-08, Jul. 2014 (Year: 2014); pp. 1-128.
Patel Kiran, Goynes Eddie, "Lower latency with AWS Elemental MediaStore chunked object transfer|AWS Media Blog," (Jul. 2, 2019), https://aws.amazon.com/blogs/media/lower-latency-with-aws-elemental-mediastore-chunked-object-transfer/, pp. 1-6.
Rupprecht Lukas, Zhangz Rui, Owen Bill, Pietzuch Peter, Hildebrandz Dean, "SwiftAnalytics: Optimizing Object Storage for Big Data Analytics," https://lsds.doc.ic.ac.uk/sites/default/files/swift-analytics_ic2e17_crv.pdf, pp. 1-7.
Sonobuoy, "Sonobuoy," https://sonobuoy.io/, 1-6 pages.
VM ware, "VMware Cloud Director Object Storage Extension Documentation.pdf," https://docs.vmware.com/en/VMware-Cloud-Director-Object-Storage-Extension/index.html, pp. 1-3.
VMware, "Introducing HCX Enterprise—Cloud Blog—VMware," (Aug. 8, 2019), https://blogs.vmware.com/cloud/2019/08/08/introducing-hcx-enterprise/, pp. 1-6.
VMware, "VMware HCX Enterprise: Non-vSphere to vSphere Workload Migration—Cloud Blog—VMware," (Aug. 8, 2019), https://blogs.vmware.com/cloud/2019/08/08/vmware-hcx-enterprise-non-vsphere-vsphere-workload-migration/, pp. 1-7.
VMware, "VMware Object Storage Interoperability Service-Development Guide," (Sep. 2021), https://www.vmware.com/content/dam/digitalmarketing/vmware/en/pdf/docs/vmware-object-storage-interoperability-service-development-guide.pdf, pp. 1-19.
Wikipedia, "Chunked transfer encoding," https://en.wikipedia.org/wiki/Chunked_transfer_encoding, pp. 1-4/.
Woodward Liz, "What is Elastic Cloud Storage—A Guide to ECS in 2022," https://www.cloudwards.net/what-is-elastic-cloud-storage/, pp. 1-8.
Foreign Search Report on EP 21210465.7 dated Apr. 14, 2022.
Foreign Search Report on EP 21210465.7 dated Apr. 7, 2022.
Pritchard, Stephen, "Object Storage: On Prem, in the cloud and hybrid," (Sep. 27, 2018), https://www.computerweekly.com/news/252449283/Object-storage-On-prem-in-the-cloud-and-hybrid, pp. 1-8.
Final Office Action on U.S. Appl. No. 17/358,967 dated Feb. 22, 2023.
OpenStack. OpenStack Object Storage API V1 Reference—API V1 .<https://docs.huinoo.com/openstack/archive/api/openstack-object-storage/1.0/os-objectstorage-devguide-1.0.pdf>.2014. (Year: 2014).
Rivkind, Yael. Object Storage: Everything You Need to Know. <https://lakefs.io/blog/object-storage/>Nov. 25, 2020. (Year: 2020).
Sonobuoy Overview, https://sonobuoy.io/docs/v0.56.10/.
"Choosing a load balancer for your object storage environment", NetApp 2020.
"NetApp StorageGRID", NetApp 2022.
"Tutorial: Transferring data from on-premises storage to Amazon S3 in a different AWS account" https://docs.aws.amazon.com/datasync/latest/userguide/s3-cross-account-transfer.html, accessed Dec. 12, 2022.
"What is AWS Data Sync?", https://docs.aws.amazon.com/datasync/latest/userguide/what-is-datasync.html, accessed Dec. 12, 2022.
Amazon, "Copy your data between on premises object storage and AWS using AWS DataSync", Jul. 27, 2020, https://aws.amazon.com/about-aws/whats-new/2020/07/copy-your-data-between-on-premises-object-storage-and-aws-using-aws-datasync/.
Cloudian, "HyperBalance Load Balancer", https://cloudian.com/products/hyperbalance/, accessed Dec. 12, 2022.
Cloudian, "On-Premises Object Storage: Building S3 in Your Backyard", https://cloudian.com/guides/hybrid-it/on-premises-object-storage/, accessed Dec. 12, 2022.
Cloudian, "S3 Backup: The Complete Guide", https://cloudian.com/blog/s3-backup-the-complete-guide/, accessed Dec. 12, 2022.
Cloudian, "Simple, Secure, Scalable. S3-Compatible, Cloud Native Data Management", https://cloudian.com/products/hyperstore/, accessed Dec. 12, 2022.
NetApp, "StorageGRID: Smart, fast, future-proof object storage", https://www.netapp.com/data-storage/storagegrid/, accessed Dec. 12, 2022.

* cited by examiner

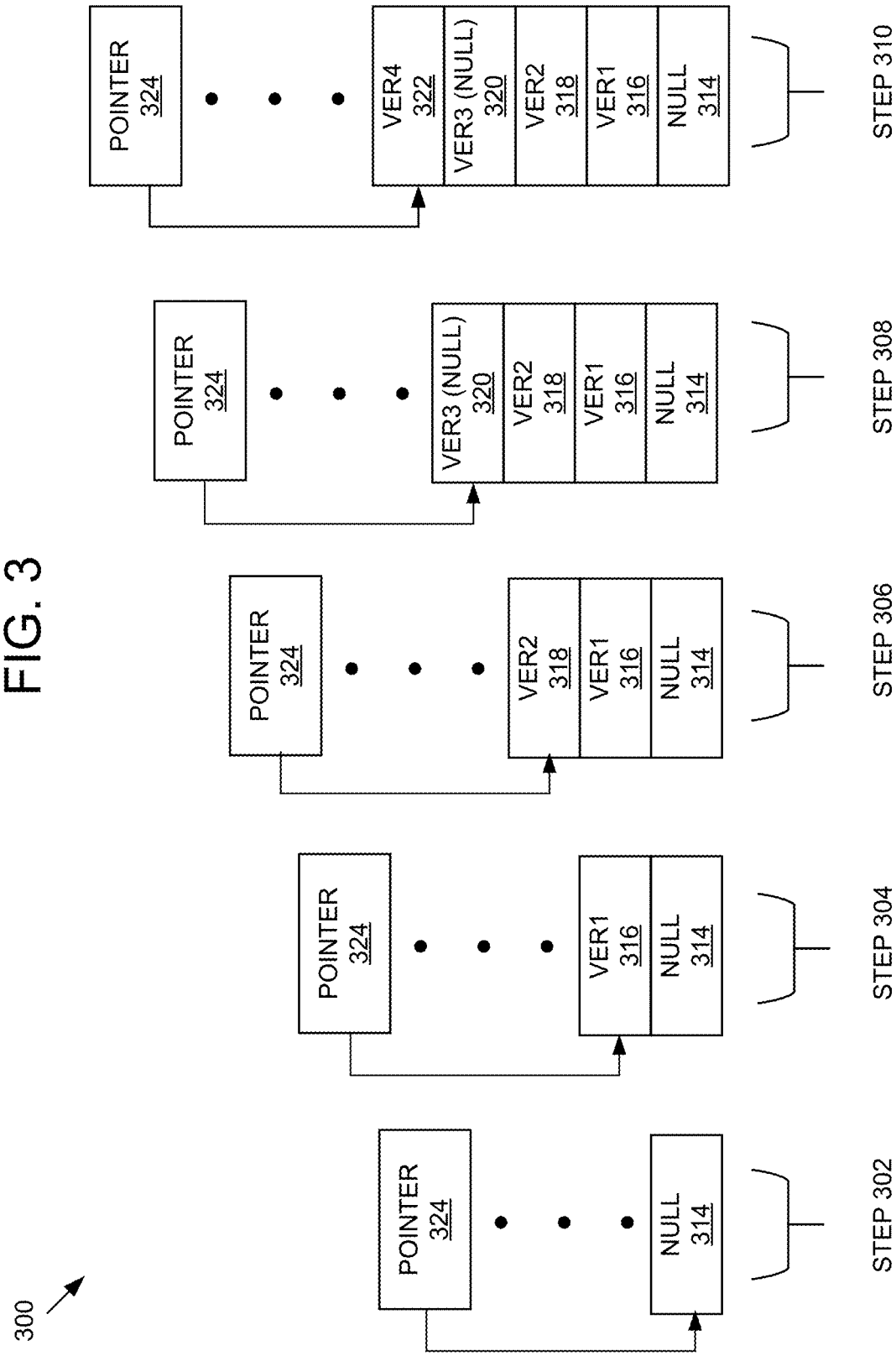

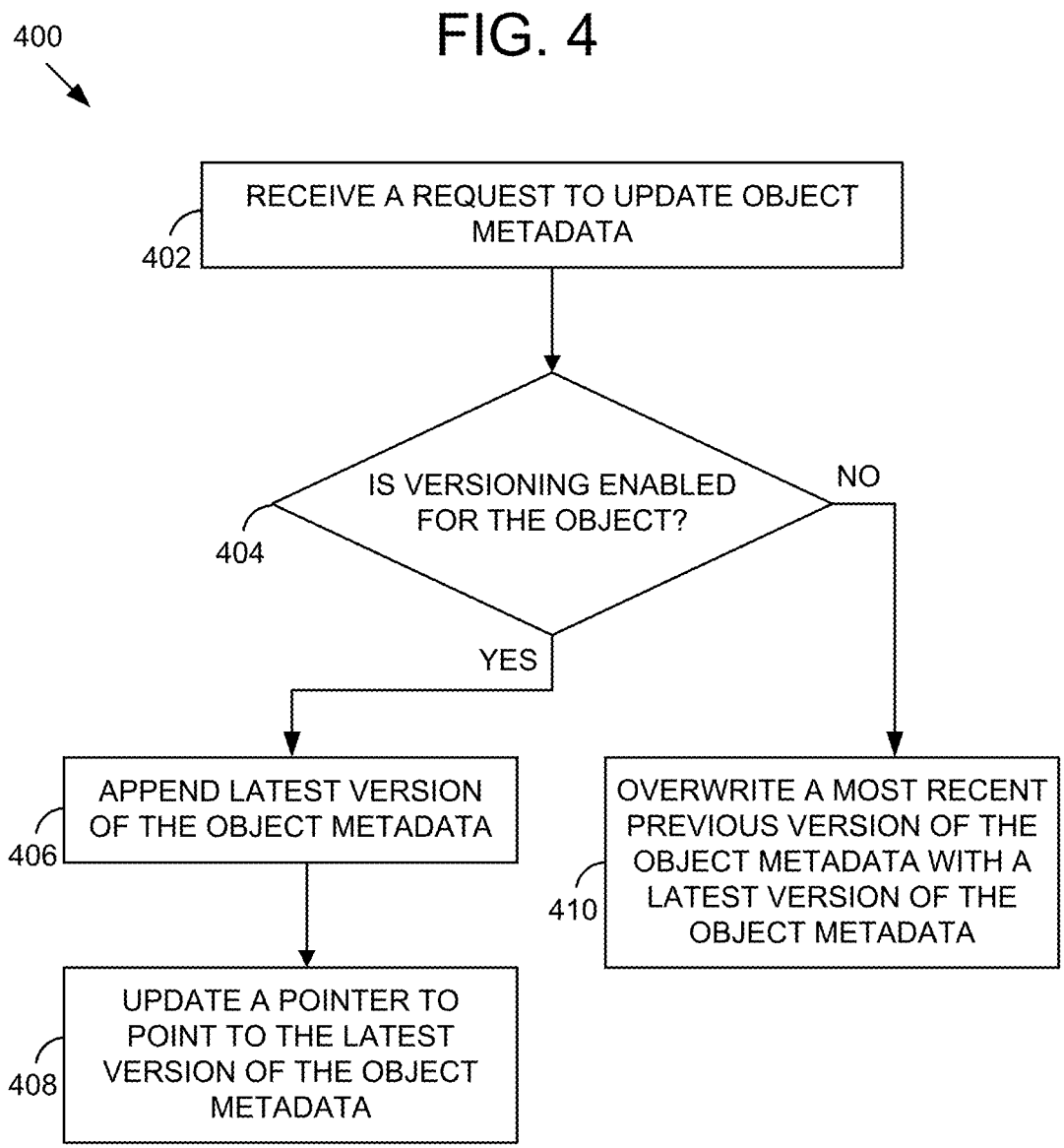

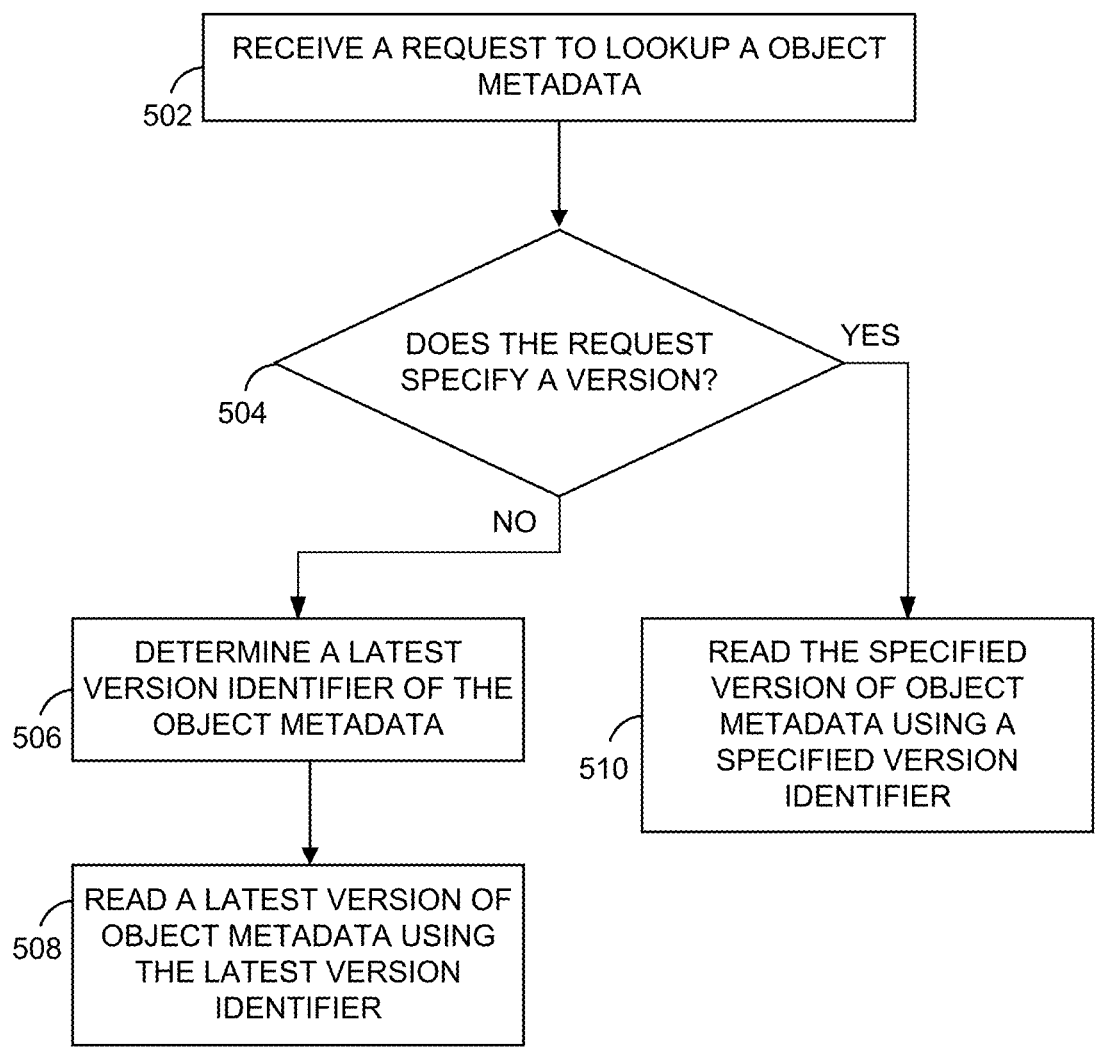

SYSTEM AND METHOD FOR SUPPORTING VERSIONED OBJECTS

CROSS-REFERENCE TO RELATED APPLICATION

This application is related to and claims priority under 35 U.S. § 119(e) from U.S. Patent Application No. 62/827,773, filed Apr. 1, 2019, titled "SYSTEM AND METHOD FOR SUPPORTING VERSIONED OBJECTS," the entire contents of which are incorporated herein by reference for all purposes.

BACKGROUND

Virtual computing systems are widely used in a variety of applications. Virtual computing systems include one or more host machines running one or more virtual machines concurrently. The virtual machines utilize the hardware resources of the underlying host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. However, the present-day virtual computing systems have limitations due to their configuration and the way they operate.

SUMMARY

Aspects of the present disclosure relate generally to a virtualization environment, and more particularly to a method of managing versioned objects.

An illustrative embodiment disclosed herein is an apparatus including a processor having programmed instructions to update a versioned object by appending a latest version of the versioned object to a data structure, read a predetermined version identifier corresponding to the latest version from a pointer entry, and look up the latest version of the versioned object, in the data structure, using the predetermined version identifier corresponding to the latest version of the versioned object.

Another illustrative embodiment disclosed herein is a non-transitory computer readable storage medium having instructions stored thereon that, upon execution by a processor, causes the processor to perform operations including updating a versioned object by appending a latest version of the versioned object to a data structure, reading a predetermined version identifier corresponding to the latest version from a pointer entry, and looking up the latest version of the versioned object, in the data structure, using the predetermined version identifier corresponding to the latest version of the versioned object.

Another illustrative embodiment disclosed herein is computer-implemented method including updating, by a processor, a versioned object by appending a latest version of the versioned object to a data structure, reading, by the processor, a predetermined version identifier corresponding to the latest version from a pointer entry, and looking up, by the processor, the latest version of the versioned object, in the data structure, using the predetermined version identifier corresponding to the latest version of the versioned object.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 3 is an example block diagram of an object version data structure at various steps, in accordance with some embodiments of the present disclosure.

FIG. 4 is an example method for updating object metadata, in accordance with some embodiments of the present disclosure.

FIG. 5 is an example method for looking up object metadata, in accordance with some embodiments of the present disclosure.

Figure 1:
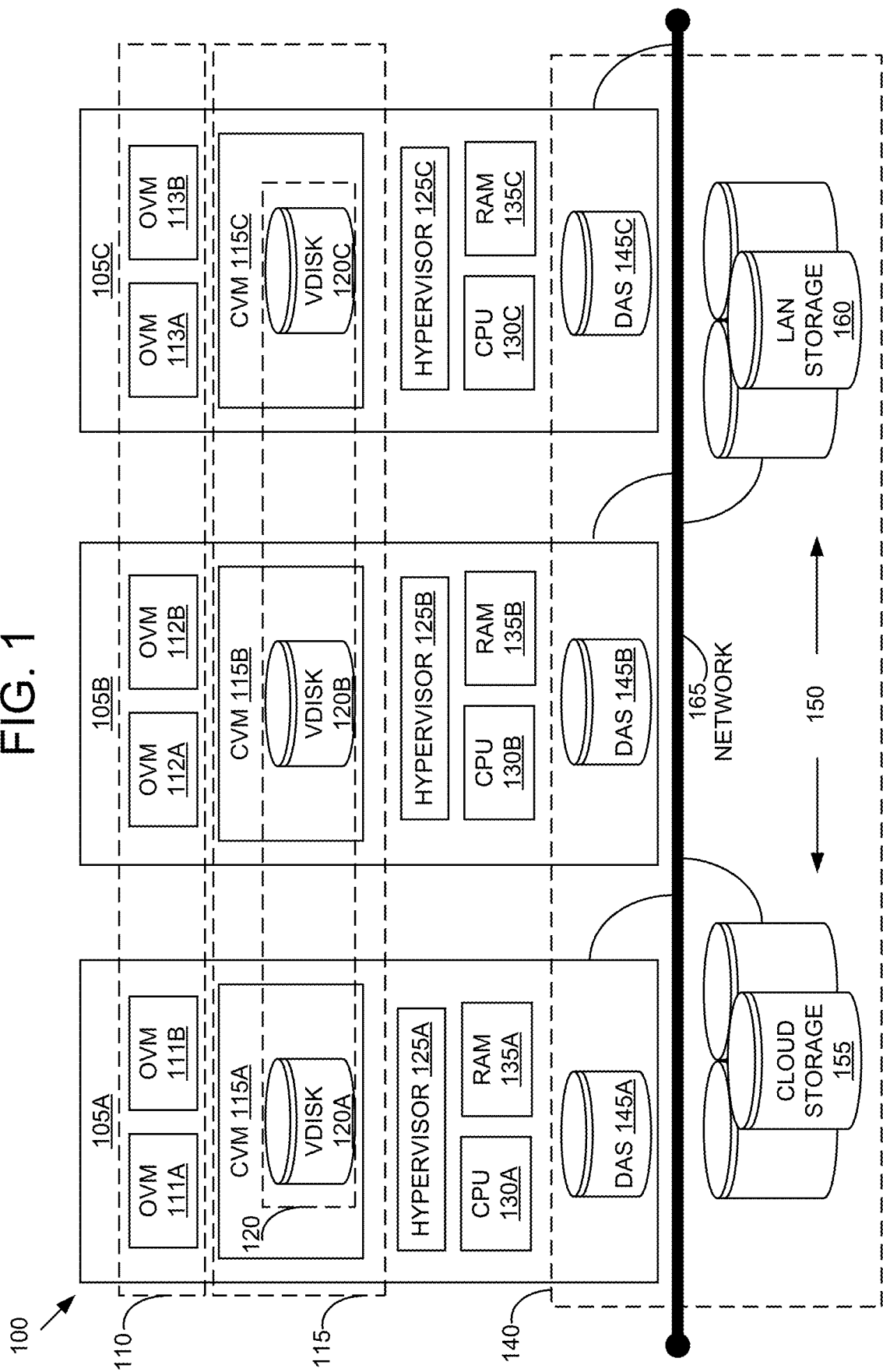
FIG. 1 is an example block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Some object versioning systems scan large amounts of unsorted data, using keys corresponding to an order of the unsorted data on disk, in order to satisfy a query for a latest object version, a query for a specified object version, or a query for list of object versions. The disk scans may result in the system having to consult multiple persistent storage data structures corresponding to the unsorted data on disk. The scans may further result in high I/O latency and low I/O throughput for satisfying the query requests. Thus, there is a technical challenge of reducing the I/O latency and increasing the I/O throughput associated with serving queries of versioned objects. What is needed is an object versioning system that can efficiently satisfy version queries.

The disclosure described herein is directed to systems and methods for implementing object versioning in a log-structured manner where version updates are appended to a data structure dedicated to the object and version queries are served by locating the dedicated data structure and locating the version using predetermined version identifiers. In some embodiments, the system maintains a special pointer that contains an identifier of the latest version of the object. In some embodiments, locating the data structure, the special pointer and/or the version includes performing n-way searches that leverage multi-level indexing, tree structures, and/or bloom filters. In some embodiments, the system maintains the object versions in order of recency, which enables a more efficient way to satisfy latest version queries and version list requests.

By leveraging a log-structured model in serving the object version queries, the present disclosure includes a technical solution to the technical challenge of reducing the I/O latency and increasing the I/O throughput associated with serving queries of versioned objects. The reduced latency will result in a more efficient utilization of compute resources and a reduction in power consumption.

Object Virtualization Technology and Environment

Referring now to FIG. 1, a virtual computing system 100 is shown, in accordance with some embodiments of the present disclosure. The virtual computing system 100 includes a plurality of nodes, such as a first node 105A, a second node 105B, and a third node 105C. The nodes may be collectively referred to herein as "nodes 105." Each of the nodes 105 may also be referred to as a "host" or "host machine." The first node 105A includes an object virtual machine ("OVMs") 111A and 111B (collectively referred to herein as "OVMs 111"), a controller virtual machine ("CVM") 115A, and a hypervisor 125A. Similarly, the second node 105B includes OVMs 112A and 112B (collectively referred to herein as "OVMs 112"), a CVM 115B, and a hypervisor 125B, and the third node 105C includes OVMs 113A and 113B (collectively referred to herein as "OVMs 113"), a CVM 115C, and a hypervisor 125C. The OVMs 111, 112, and 113 may be collectively referred to herein as "OVMs 110." The CVMs 115A, 115B, and 115C may be collectively referred to herein as "CVMs 115." The nodes 105 are connected to a network 165.

The virtual computing system 100 also includes a storage pool 140. The storage pool 140 may include network-attached storage (NAS) 150 and direct-attached storage (DAS) 145A, 145B, and 145C (collectively referred to herein as DAS 145). The NAS 150 is accessible via the network 165 and, in some embodiments, may include cloud storage 155, as well as local area network ("LAN") storage 160. In contrast to the NAS 150, which is accessible via the network 165, each of the DAS 145A, the DAS 145B, and the DAS 145C includes storage components that are provided internally within the first node 105A, the second node 105B, and the third node 105C, respectively, such that each of the first, second, and third nodes may access its respective DAS without having to access the network 165.

The CVM 115A may include one or more virtual disks ("vdisks") 120A, the CVM 115B may include one or more vdisks 120B, and the CVM 115C may include one or more vdisks 120C. The vdisks 120A, the vdisks 120B, and the vdisks 120C are collectively referred to herein as "vdisks 120." The vdisks 120 may be a logical representation of storage space allocated from the storage pool 140. Each of the vdisks 120 may be located in a memory of a respective one of the CVMs 115. The memory of each of the CVMs 115 may be a virtualized instance of underlying hardware, such as the RAMs 135 and/or the storage pool 140. The virtualization of the underlying hardware is described below.

In some embodiments, the CVMs 115 may be configured to run a distributed operating system in that each of the CVMs 115 run a subset of the distributed operating system. In some such embodiments, the CVMs 115 form one or more Nutanix Operating System ("NOS") cluster. In some embodiments, the one or more NOS clusters include greater than or fewer than the CVMs 115. In some embodiments, each of the CVMs 115 run a separate, independent instance of an operating system. In some embodiments, the one or more NOS clusters may be referred to as a storage layer.

In some embodiments, the OVMs 110 form an OVM cluster. OVMs of an OVM cluster may be configured to share resources with each other. The OVMs in the OVM cluster may be configured to access storage from the NOS cluster using one or more of the vdisks 120 as a storage unit. The OVMs in the OVM cluster may be configured to run software-defined object storage service, such as Nutanix Buckets™. The OVM cluster may be configured to create buckets, add objects to the buckets, and manage the buckets and objects. In some embodiments, the OVM cluster include greater than or fewer than the OVMs 110.

Multiple OVM clusters and/or multiple NOS clusters may exist within a given virtual computing system (e.g., the virtual computing system 100). The one or more OVM clusters may be referred to as a client layer or object layer. The OVM clusters may be configured to access storage from multiple NOS clusters. Each of the OVM clusters may be configured to access storage from a same NOS cluster. A central management system, such as Prism Central, may manage a configuration of the multiple OVM clusters and/or multiple NOS clusters. The configuration may include a list of OVM clusters, a mapping of each OVM cluster to a list of NOS clusters from which the OVM cluster may access storage, and/or a mapping of each OVM cluster to a list of vdisks that the OVM cluster owns or has access to.

Each of the OVMs 110 and the CVMs 115 is a software-based implementation of a computing machine in the virtual computing system 100. The OVMs 110 and the CVMs 115 emulate the functionality of a physical computer. Specifically, the hardware resources, such as CPU, memory, storage, etc., of a single physical server computer (e.g., the first node 105A, the second node 105B, or the third node 105C) are virtualized or transformed by the respective hypervisor (e.g. the hypervisor 125A, the hypervisor 125B, and the hypervisor 125C), into the underlying support for each of the OVMs 110 and the CVMs 115 that may run its own operating system, a distributed operating system, and/or applications on the underlying physical resources just like a real computer. By encapsulating an entire machine, including CPU, memory, operating system, storage devices, and network devices, the OVMs 110 and the CVMs 115 are compatible with most standard operating systems (e.g. Windows, Linux, etc.), applications, and device drivers. Thus, each of the hypervisors 125 is a virtual machine monitor that allows the single physical server computer to run multiple instances of the OVMs 110 (e.g. the OVM 111) and at least one instance of a CVM 115 (e.g. the CVM 115A), with each of the OVM instances and the CVM instance sharing the resources of that one physical server computer, potentially across multiple environments. By running the multiple instances of the OVMs 110 on a node of the nodes 105, multiple workloads and multiple operating systems may be run on the single piece of underlying hardware computer to increase resource utilization and manage workflow.

The hypervisors 125 of the respective nodes 105 may be configured to run virtualization software, such as, ESXi from VMWare, AHV from Nutanix, Inc., XenServer from Citrix Systems, Inc., etc. The virtualization software on the hypervisors 125 may be configured for managing the interactions between the respective OVMs 110 (and/or the CVMs 115) and the underlying hardware of the respective nodes 105. Each of the CVMs 115 and the hypervisors 125 may be configured as suitable for use within the virtual computing system 100.

In some embodiments, each of the nodes 105 may be a hardware device, such as a server. For example, in some embodiments, one or more of the nodes 105 may be an NX-1000 server, NX-3000 server, NX-5000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the nodes 105 may be another type of hardware device, such as a personal computer, an input/output or peripheral unit such as a printer, or any type of device that is suitable for use as a node within the virtual computing system 100. In some embodiments, the virtual computing system 100 may be part of a data center.

The first node 105A may include one or more central processing units ("CPUs") 130A, the second node 105B may include one or more CPUs 130B, and the third node 105C may include one or more CPUs 130C. The CPUs 130A, 130B, and 130C are collectively referred to herein as the CPUs 130. The CPUs 130 may be configured to execute instructions. The instructions may be carried out by a special purpose computer, logic circuits, or hardware circuits of the first node 105A, the second node 105B, and the third node 105C. The CPUs 130 may be implemented in hardware, firmware, software, or any combination thereof. The term "execution" is, for example, the process of running an application or the carrying out of the operation called for by an instruction. The instructions may be written using one or more programming language, scripting language, assembly language, etc. The CPUs 130, thus, execute an instruction, meaning that they perform the operations called for by that instruction.

The first node 105A may include one or more random access memory units ("RAM") 135A, the second node 105B may include one or more RAM 135B, and the third node 105C may include one or more RAM 135C. The RAMs 135A, 135B, and 135C are collectively referred to herein as the RAMs 135. The CPUs 130 may be operably coupled to the respective one of the RAMs 135, the storage pool 140, as well as with other elements of the respective ones of the nodes 105 to receive, send, and process information, and to control the operations of the respective underlying node. Each of the CPUs 130 may retrieve a set of instructions from the storage pool 140, such as, from a permanent memory device like a read only memory ("ROM") device and copy the instructions in an executable form to a temporary memory device that is generally some form of random access memory ("RAM"), such as a respective one of the RAMs 135. One of or both of the ROM and RAM be part of the storage pool 140, or in some embodiments, may be separately provisioned from the storage pool. The RAM may be stand-alone hardware such as RAM chips or modules. Further, each of the CPUs 130 may include a single stand-alone CPU, or a plurality of CPUs that use the same or different processing technology.

Each of the DAS 145 may include a variety of types of memory devices. For example, in some embodiments, one or more of the DAS 145 may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the NAS 150 may include any of a variety of network accessible storage (e.g., the cloud storage 155, the LAN storage 160, etc.) that is suitable for use within the virtual computing system 100 and accessible via the network 165. The storage pool 140, including the NAS 150 and the DAS 145, together form a distributed storage system configured to be accessed by each of the nodes 105 via the network 165, one or more of the OVMs 110, one or more of the CVMs 115, and/or one or more of the hypervisors 125.

Each of the nodes 105 may be configured to communicate and share resources with each other via the network 165, including the respective one of the CPUs 130, the respective one of the RAMs 135, and the respective one of the DAS 145. For example, in some embodiments, the nodes 105 may communicate and share resources with each other via one or more of the OVMs 110, one or more of the CVMs 115, and/or one or more of the hypervisors 125. One or more of the nodes 105 may be organized in a variety of network topologies.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Although three of the plurality of nodes (e.g., the first node 105A, the second node 105B, and the third node 105C) are shown in the virtual computing system 100, in other embodiments, greater than or fewer than three nodes may be used. Likewise, although only two of the OVMs are shown on each of the first node 105A (e.g. the OVMs 111), the second node 105B, and the third node 105C, in other embodiments, greater than or fewer than two OVMs may reside on some or all of the nodes 105.

It is to be understood again that only certain components and features of the virtual computing system 100 are shown and described herein. Nevertheless, other components and features that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

Object Metadata Versioning

Objects are collections of unstructured data that includes the object data and object metadata describing the object or the object data. In some embodiments, the object metadata includes one or more unique identifiers. A bucket is a logical construct that is used to store objects in an underlying storage technology. In some embodiments, the bucket includes references to object data associated with the bucket. In some embodiments, the bucket includes a data structure that maps object identifiers to locations in the underlying storage technology where the objects associated with the object identifiers are stored. In some embodiments, the bucket has policies that determine how the objects associated with the bucket are managed, updated, and replicated, among others. The objects can be associated to the buckets by users and/or the policies. The buckets can be partitioned into bucket partitions. Some services, such as metadata service, may be responsible for managing objects for a sub-set of the bucket partitions.

Figure 2:
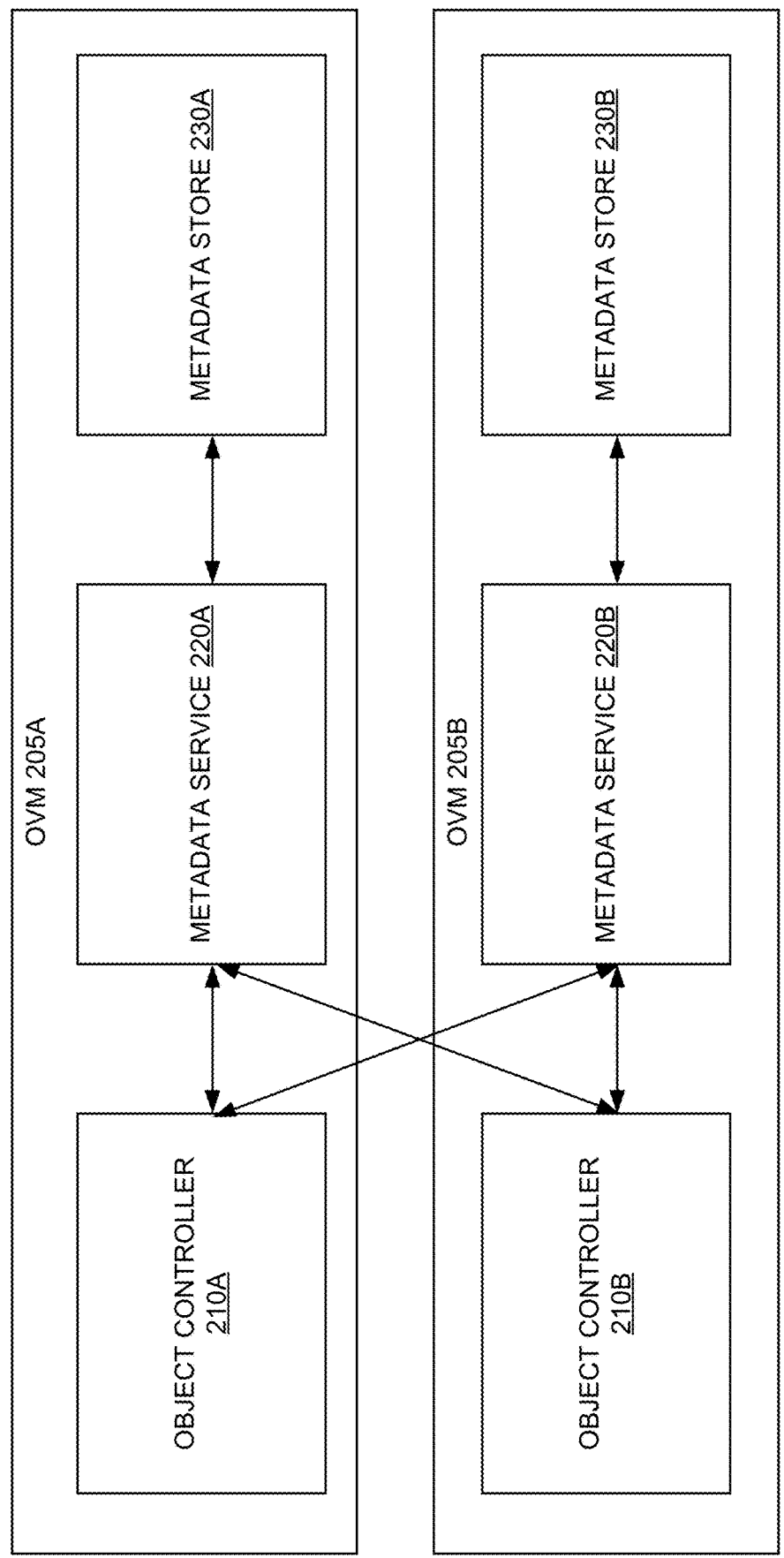
FIG. 2 is an example block diagram of an OVM cluster for versioning object metadata, in accordance with some embodiments of the present disclosure.

Referring now to FIG. 2, an example embodiment of an OVM cluster 200 for versioning object metadata is shown. In brief overview, the OVM cluster 200 for versioning object metadata includes an OVM 205A and an OVM 205B. The OVM 205A includes an object controller 210A, a metadata service 220A, and a metadata store 230A. Similarly, the OVM 205B includes an object controller 210B, a metadata service 220B, and a metadata store 230B. The OVMs 205A and 205B may be instances of the OVM 111A with respect to FIG. 1. Without loss of generality, functionality of components of the OVMs 205A (e.g. the object controller 210A, the metadata service 220A, and the metadata store 230A) and 205B (e.g. the object controller 210B, the metadata service 220B, and the metadata store 230B) is described with respect to the OVM 205A.

Each of the elements or entities of the virtual computing system 100 and the OVM cluster 200 (e.g. the OVM 205A, the object controller 210A, the metadata service 220A, and the metadata store 230A), is implemented using hardware or a combination of hardware or software, in one or more embodiments. For instance, each of these elements or entities can include any application, program, library, script, task, service, process or any type and form of executable instructions executing on hardware of the virtual computing system 100 and/or the OVM cluster 200. The hardware includes circuitry such as one or more processors (e.g. the CPU 130A) in one or more embodiments. Each of the one or more processors is hardware. The OVM 205A, the object controller 210A, the metadata service 220A, the metadata store 230A, or a combination thereof may be an apparatus including a processor having programmed instructions. The instructions may be stored on one or more computer readable and/or executable storage media including non-transitory storage media such as non-transitory storage media in the storage pool 140 with respect to FIG. 1.

The object controller 210A may include a processor having programmed instructions (hereinafter, the object controller 210A having programmed instructions) to receive and serve object requests from a client, including requests to create, read, update, and delete. The object controller 210A is not limited to serving objects for a specific bucket partition. The client object request may be in accordance with representational state transfer (REST) application programming interface (API) protocol. The client object request may include parameters associated with the object such as an object identifier, a bucket identifier, a bucket partition identifier, a number of bucket partitions and/or a requested version of the object being requested.

In order to serve client object requests, the object controller 210A may include programmed instructions to request one or more metadata lookups (e.g. queries) and/or metadata updates from one or more metadata services (e.g. the metadata services 220A and/or 220B). The one or more metadata lookups and/or metadata updates are associated with the client object request. For example, the metadata lookup may include a lookup of a vdisk, such as the vdisk 120A, and/or an offset of the vdisk, where an object associated with a client update request is to be written to. In another example, the metadata update may be an update to a timestamp indicating when the object data was last updated on the vdisk. The metadata update may be an update to the offset of the vdisk where the object data is being written (e.g. different versions of object data can be written at different offsets or different vdisks and can be tracked by the metadata).

The object controller 210A may maintain a handle such as one or more object parameters or a concatenation of object parameters. The object parameters can be received from the client or from a component in the OVM 205A. The object controller 210A may generate a key by hashing the handle. In some embodiments, the key is an index. In some embodiments, the index may correspond to a metadata entry of the object (e.g. the metadata entry can be found at the index of an array). In some embodiments, the index may correspond to a group of multiple metadata entries of the object. Each metadata entry of the group of multiple metadata entries may correspond to a different version of the object (e.g. each metadata entry can be found at a two-dimensional index of a two-dimensional array).

The object controller 210A may determine an identity of the one or more metadata services for servicing the metadata lookup and/or metadata update. The object controller 210A may determine the identity of the one or more metadata services by querying a component in the OVM 205A such as a region manager or a bucket partitioner. The region manager may determine how regions are carved out from vdisks for storing object data. The bucket partitioner may assign objects to partitions. In some implementations, the bucket partitioner may dynamically assign partitions and return previous partitions based on stored metadata.

The metadata service 220A may include a processor having programmed instructions (hereinafter, the metadata service 220A having programmed instructions) to serve requests for metadata lookups and metadata updates from the object controller 210A. The metadata service 220A may be assigned to metadata of objects that reside in a subset of bucket partitions. In some embodiments, the metadata service 220A may forward the metadata request to another metadata service (e.g. the metadata service 220B) in response to determining that the metadata service 220A is not assigned to the object being requested.

The metadata service 220A may include programmed instructions to serve the metadata update request by appending the metadata to a data structure in the metadata store 230A. The metadata service 220A may include programmed instructions to serve the metadata lookup request by looking up the metadata entry or the group of metadata entries that is located at an index in the data structure in the metadata store 230A. The metadata service 220A may receive from the object controller 210A the index associated with the metadata lookup.

The metadata store 230A is a log-structured-merge (LSM) based key-value store including key-value data structures in memory and persistent storage. The data structures may be implemented as indexed arrays including metadata entries and corresponding indices. The indexed arrays may be multi-dimensional such that a first dimension indexes the different objects and a second dimension indexes the versions of the respective different objects. For example, each object is assigned to a row and each version of the object is assigned to a column in that row. The indices may be represented numerically or strings. Each metadata entry may include a key-value pair including a key and one or more values. The key may be a hash of an object handle associated with an object whose metadata is stored in the metadata entry. The object handle may include the object identifier, the bucket identifier, the bucket partition identifier, the number of bucket partitions and/or the requested version associated with the metadata entry.

In some embodiments, the data structures are tree data structures. N-way searches (e.g. binary searches, 3-way searches, or 4-way searches, among others) may be performed in the tree data structures. In the tree data structure, the received index may be compared to indices of a first array. If a match is found, the metadata entry of the matching index may be read. If a match is not found, the received index may follow a pointer located between the two closest indices to a second data structure where the process repeats until a matching index is found. The data structures may include bloom filters for determining whether one or more blocks of the data structures include the received index. Each of the one or more blocks of the data structures may include a row corresponding to an object and all its versions. Each of the one or more blocks of the data structures may be referred to herein as an object version data structure.

Object metadata updates to the metadata store 230A may be achieved by appending the update to the object metadata (e.g. by writing the update to a new entry, which has not been written to yet). The new metadata entries may be stored in a data structure located in memory (e.g. RAM), and, upon the memory size reaching a predetermined threshold, the metadata store 230A may merge batches of the new metadata entries to one or more of the data structures located in persistent storage (e.g. SSD). The metadata service 220A may look up object metadata in the metadata store 230A by searching the indices of the data structures until a matching index is found. The search may be a sequential search or an n-way search. The n-way search may include leveraging bloom filters, tree structures, or other multi-level indexing. In some embodiments, the matching index corresponds to an object, and a default metadata entry, such as a pointer entry or a latest entry is read. In some embodiments, the matching index corresponds to an object and a specified metadata entry. Once the metadata entry is found, the metadata service 220A may read the metadata.

Referring now to FIG. 3, an example embodiment of an object version data structure 300 at various steps. Without loss of generality, the object version data structure 300 is described with respect to one object. Without loss of generality, the object version data structure 300 may be referred to as a row which includes multiple columns. The object version data structure 300 may reside in the metadata store 230A. Each column may include a metadata entry (referred to herein as "entry"). Each entry may correspond to a version of the object. In some embodiments, a column includes multiple entries. The metadata service 220A may update the object metadata with a new version by writing the updated object metadata to a new metadata entry of the data structure. Updating the object metadata with the new version may include updating a pointer entry, which is described below. In some embodiments, updating the object metadata with a new version may include archiving, which is copying the previous entries and appending them to the new entry in the new column.

Each entry may include a version identifier to indicate the version. The version identifier may be represented numerically or as a string. In some embodiments, the version identifier is the index associated with the metadata entry described with respect to FIG. 2. In some embodiments, the metadata entry can be located by finding the index that matches the version identifier associated with the entry. The version identifier of a subsequent new entry for an object may be greater than the version identifier of a previous entry. In some embodiments, the version identifier is globally unique (i.e. unique across all objects). In some embodiments, each object has its own version identifier namespace, so that versions of metadata from different objects can have a same version identifier.

Properties of a column during an object update may depend on a state of the object. The states may include a disabled versioning state, an enabled versioning state, and a suspended versioning state. For example, at step 302, a column including a NULL entry 314 is created when the versioning is disabled (i.e. the version was never enabled). The NULL entry 314 may be overwritten whenever the object is updated. At step 304, a column may be created when object versioning is enabled and the object is updated. For example, a column including a VER1 entry 316 is appended to the column including the NULL entry 314. While the state remains in the versioning enabled state, a subsequent object update will create a new column. For example, at step 306, the subsequent update causes a column including a VER2 entry 318 to be created, where the column including the VER2 entry 318 is appended to the column including the VER1 entry 316. When the versioning is suspended (i.e. when versioning goes from enabled to not being enabled), a first object update will create a new NULL version and delete the previous NULL version. For example, at step 308, the first update after suspending causes a column including a VER3 (NULL) entry 320 to be created, where the column including the VER3 (NULL) entry 320 is appended to the column including the VER2 entry 318. For subsequent updates in the suspended state, the VER3 (NULL) entry 320 may be overwritten (similar to the disabled state). In some embodiments, the column including the NULL entry 314 is removed. An update after versioning is enabled may cause a column to be created. For example, at step 310, a column including a VER4 entry 322 may be created and appended to the VER3 (NULL) entry 320. The step 310 may have similar properties to the steps 304 and 306.

The object version data structure 300 may include a special column which may include a pointer entry, such as a pointer entry 324. The pointer entry may not include the usual object parameters of the corresponding object. Instead, the pointer entry may include a version identifier of a latest entry of the object (e.g. the VER4 entry 322). The version identifier of the latest entry of the object may be referred to herein as a "latest version identifier." The pointer entry may include a version identifier of the pointer entry. In some embodiments, the pointer entry can be located by finding the index that matches the version identifier of the pointer entry. In some embodiments, the version identifier of the pointer entry may be a constant such as INT64_MAX. In some embodiments, the pointer entry of the object may be located in a different object version data structure than the metadata entries of the object.

The metadata service 220A may look up a latest version of the object. In some embodiments, the metadata service 220A may look up a latest version of the object by locating the pointer entry. In some embodiments, the location of the pointer entry may be known, in advance, by the metadata service 220A. In some embodiments, the pointer entry may be located by a version identifier or other index. The version identifier or other index may be a constant. The pointer entry may include, as its value, a latest version identifier of a latest version of an object associated with the pointer entry. Once the pointer entry is located, the metadata service 220A may read the pointer entry to determine the latest version identifier. The metadata service 220A can locate the latest entry by performing a direct lookup using the latest version identifier. The metadata service 220A may read the latest entry and fetch the key-value pair of the latest entry and send the key-value pair to the object controller 210A. In some embodiments, the metadata service 220A may use a search to find the pointer entry, the latest entry, and/or the data structure 300 associated with the pointer entry and/or the latest entry. The search may be a sequential search or an n-way search. When doing an n-way search, the metadata service 220A may use a bloom filter or tree structures of the metadata store 230A to find an index corresponding to the data structure 300 (e.g. the row) of a larger data structure. The data structure 300 may be where the object having the associated pointer entry and/or the latest entry resides. Likewise, during an n-way search, the metadata service 220A may use the bloom filter or the tree structures to find the pointer entry and/or the latest entry in the data structure 300.

In some embodiments, the metadata service 220A may look up a latest version of the object without using a pointer entry. The metadata service 220A may sort the entries (e.g. the columns) based on the version identifiers, from highest version identifier to lowest version identifier. The metadata service 220A may read the first entry of the sorted entries.

The metadata service 220A may look up a specified version of the object. Looking up the specified version may include looking up the specified version using a specified version identifier or index. The index may be a key calculated based on a hash of the object name and the specified version. The specified version identifier or index may be provided to the metadata service 220A by the object controller 210A. Looking up the specified version may be similar to looking up a latest version except that one read (e.g. the specified version identifier) is performed rather than two reads (e.g. the pointer entry and the latest version identifier). Looking up the specified version may include searching metadata entries until a metadata entry having the specified version identifier or index is found. The search may be a sequential search or an n-way search.

The metadata service 220A may look up a list of the versions of object metadata of an object from newest versions to oldest versions. Looking up a list is similar to looking up a latest version except that after finding the entry having a latest version identifier, the metadata service 220A may read all of the entries in the data structure 300. Each entry in the read may have its own version identifier. In some embodiments, the metadata service 220A may flip each of the version identifier by subtracting each version identifier from a constant such as INT64_MAX. After flipping the version identifiers, the metadata service 220A may read all object metadata corresponding to the object. The version identifier may be stored in big endian representation or little endian representation.

In some embodiments, the metadata service 220A looks up the list of versions. In some embodiments, looking up a list is performed without using a pointer entry similarly to how the metadata service 220A may look up the latest version of the object without using a pointer entry except that it requires the additional read described herein with respect to looking up the list. In some embodiments, a list request associated with the list lookup includes a predetermined threshold (e.g. predefined number of versions or a sum of the latest version and a predefined number of versions). In some such embodiments, the metadata service 220A sorts the metadata entries based on the version identifiers, from highest to lowest, and reads metadata entries until the number of metadata entries is read. In some embodiments, the metadata entries are pre-sorted. In some embodiments, the metadata service 220A determines a version, an index, or a location of the latest metadata entry (which may also be the first metadata entry) by reading the latest version identifier in the pointer entry. In some embodiments, the number of metadata entries is tracked with a counter. In some embodiments, the counter is initialized to a prefixed number (e.g. zero or the latest version identifier in the pointer entry). In some embodiments, the metadata service 220A reads a first metadata entry at an index equal to the counter. In some embodiments, the metadata service 220A increments the counter. In some embodiments, the metadata service 220A repeats reading metadata entries and incrementing the counter until the counter satisfies (e.g. equal than or greater than) the predetermined threshold.

Referring now to FIG. 4, an example method 400 for updating object metadata is shown. The method 400 for updating object metadata may be implemented using, or performed by, the components of the virtual computing system 100, and/or the OVM cluster 200, which are detailed herein with respect to FIG. 1 and FIG. 2, respectively. The method 400 for updating object metadata may be implemented using, or performed by, the object controller 210A, a processor associated with the object controller 210A, the metadata service 220A, or a processor associated with the metadata service 220A. The method 400 updating object metadata may be implemented using the object version data structure 300 detailed herein with respect to FIG. 3. Additional, fewer, or different operations may be performed in the method 400 depending on the embodiment.

At operation 402, a metadata service, such as the metadata service 220A, may receive a request to update object metadata. At operation 404, the metadata service may determine whether versioning is enabled for the object. Responsive to determining, at operation 404, that versioning is enabled for the object, the method 400 proceeds to operations 406-408. Otherwise the method 400 proceeds to operation 410. In some embodiments, the metadata service may copy and append previous versions of the object metadata to a data structure, such as the object version data structure 300, in a metadata store, such as the metadata store 230A. At operation 406, the metadata service may append a latest version of the object metadata to the data structure of the object metadata. The latest version may be embodied as a metadata entry. At operation 408, the metadata service may update a pointer to point to the latest version of the object metadata. The pointer may be embodied as a pointer entry that includes a version identifier of the latest entry. At operation 410, the metadata service may overwrite a most recent version of the previous versions of the object metadata with a latest version of the object metadata.

In some embodiments, the object metadata to be updated may be in a data structure different from data structures having metadata of other objects. The method 400 for updating object metadata may further include locating the data structure at an index equal to a hash of an object parameter associated with the object.

Referring now to FIG. 5, an example method 500 for looking up object metadata is shown. The method 500 for looking up object metadata may be implemented using, or performed by, the components of the virtual computing system 100, and/or the OVM cluster 200, which are detailed herein with respect to FIG. 1 and FIG. 2, respectively. The method 500 for looking up object metadata may be implemented using, or performed by, the object controller 210A, a processor associated with the object controller 210A, the metadata service 220A, or a processor associated with the metadata service 220A. The method 500 for looking up object metadata may be implemented using the object version data structure 300 detailed herein with respect to FIG. 3. Additional, fewer, or different operations may be performed in the method 500 depending on the embodiment.

At operation 502, a metadata service, such as the metadata service 220A, may receive a request to look up object metadata. At operation 504, the metadata service may determine whether the request specifies a version of the object to be looked up. Determining whether the request specifies a version may include determining whether the metadata service received, in the request, a specified version identifier. Responsive to determining, at operation 504, that the request does not specify a version of the object to be looked up, the method 500 proceeds to operations 506-508. Otherwise the method 500 proceeds to operation 510.

At operation 506, the metadata service may determine a latest version identifier of the object metadata. In some embodiments, the metadata service reads a predetermined version identifier corresponding to the latest version from a pointer entry. In some embodiments, the pointer entry is in a data structure, such as the object version data structure 300, in the metadata store, such as the metadata store 230A. At operation 508, the metadata service may read the latest version of object metadata using the latest version identifier. In some embodiments, the metadata service looks up the latest version of the versioned object, in the data structure, using the predetermined version identifier corresponding to the latest version of the versioned object. In some embodiments, the predetermined version identifier is an index at which the latest version of the versioned object is located. At operation 510, the metadata service reads the specified version of object metadata using the specified version identifier. Reading the specified version of object metadata using the specified version identifier may include searching object metadata entries until finding a metadata entry including the specified version identifier. The search may be a sequential search or an n-way search.

In some embodiments, the object metadata to be looked up may be in a data structure different from data structures having metadata of other objects. In some embodiments, the data structure including the object metadata may be a part of a larger data structure. In some such embodiments, a search may be performed to locate the data structure within the larger data structure. The method 500 for looking up object metadata may further include locating the data structure at an index equal to a hash of an object parameter associated with the object.

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed:

1. An apparatus comprising a processor and memory, wherein the memory includes programmed instructions that, when executed by the processor, cause the apparatus to:
   update a versioned object by appending a latest version of the versioned object to a data structure;
   update a pointer entry in a pointer from a first version identifier associated with a previous version of the versioned object to a second version identifier associated with the latest version;
   read the second version identifier from the pointer entry; and
   look up the latest version of the versioned object, in the data structure, using the second version identifier corresponding to the latest version of the versioned object.

2. The apparatus of claim 1, wherein the memory includes programmed instructions that, when executed by the processor, further cause the apparatus to:
   determine that versioning is suspended for the versioned object; and
   overwrite the latest version of the versioned object with a second latest version of the versioned object.

3. The apparatus of claim 1, wherein the memory includes programmed instructions that, when executed by the processor, further cause the apparatus to perform an n-way search of a second data structure to locate the data structure.

4. The apparatus of claim 1, wherein the memory includes programmed instructions that, when executed by the processor, further cause the apparatus to look up a specified version of the versioned object by searching each metadata entry of the versioned object until finding a first metadata entry having a version identifier matching a specified version identifier corresponding to the specified version of the versioned object.

5. The apparatus of claim 1, wherein the memory includes programmed instructions that, when executed by the processor, further cause the apparatus to:
   sort metadata entries corresponding to the versioned object; and
   read each of the sorted metadata entries.

6. The apparatus of claim 1, wherein the data structure is a log-structured-merge tree.

7. A non-transitory computer readable storage medium comprising instructions stored thereon that, upon execution by a processor, cause the processor to:
   update a versioned object by appending a latest version of the versioned object to a data structure;
   update a pointer entry in a pointer from a first version identifier associated with a previous version of the versioned object to a second version identifier associated with the latest version;
   read the second version identifier corresponding to the latest version from the pointer entry; and
   look up the latest version of the versioned object, in the data structure, using the second version identifier corresponding to the latest version of the versioned object.

8. The storage medium of claim 7, comprising the instructions stored thereon that, upon execution by the processor, further cause the processor to:
   determine that versioning is suspended for the versioned object; and
   overwrite the latest version of the versioned object with a second latest version of the versioned object.

9. The storage medium of claim 7, comprising the instructions stored thereon that, upon execution by the processor, further cause the processor to perform an n-way search of a second data structure to locate the data structure.

10. The storage medium of claim 7, comprising the instructions stored thereon that, upon execution by the processor, further cause the processor to look up a specified version of the versioned object by searching each metadata entry of the versioned object until finding a first metadata entry having a version identifier matching a specified version identifier corresponding to the specified version of the versioned object.

11. The storage medium of claim 7, comprising the instructions stored thereon that, upon execution by the processor, further cause the processor to:
   sort metadata entries corresponding to the versioned object; and
   read each of the sorted metadata entries.

12. The storage medium of claim 7, wherein the data structure is a log-structured-merge tree.

13. A computer-implemented method comprising:
   updating, by a processor, a versioned object by appending a latest version of the versioned object to a data structure;
   updating, by the processor, a pointer entry in a pointer from a first version identifier associated with a previous version of the versioned object to a second version identifier associated with the latest version;
   reading, by the processor, the second version identifier corresponding to the latest version from the pointer entry; and
   looking up, by the processor, the latest version of the versioned object, in the data structure, using the second version identifier corresponding to the latest version of the versioned object.

14. The method of claim 13, further comprising:
   determining, by the processor, that versioning is suspended for the versioned object; and
   overwriting the latest version of the versioned object with a second latest version of the versioned object.

15. The method of claim 13, further comprising performing, by the processor, an n-way search of a second data structure to locate the data structure.

16. The method of claim 13, further comprising looking up, by the processor, a specified version of the versioned object by searching each metadata entry of the versioned object until finding a first metadata entry having a version identifier matching a specified version identifier corresponding to the specified version of the versioned object.

17. The method of claim 13, further comprising:
   sorting, by the processor, metadata entries corresponding to the versioned object; and
   reading each of the sorted metadata entries.

18. The apparatus of claim 2, wherein the memory includes programmed instructions that, when executed by the processor, further cause the apparatus to update the pointer entry in the pointer to a null version identifier.

19. The storage medium of claim 8, comprising the instructions stored thereon that, upon execution by the processor, further cause the processor to update the pointer entry in the pointer to a null version identifier.

20. The method of claim 14, further comprising to update the pointer entry in the pointer to a null version identifier.

\* \* \* \* \*